(12) United States Patent
Zhou et al.

(10) Patent No.: US 12,502,787 B2
(45) Date of Patent: Dec. 23, 2025

(54) CONVEYOR BELT LIFTING MECHANISM AND ONLINE OPERATION AND MAINTENANCE ROBOT FOR PIPE BELT CONVEYOR

(71) Applicant: Taiyuan University of Science and Technology, Taiyuan (CN)

(72) Inventors: Lidong Zhou, Taiyuan (CN); Peng Wei, Taiyuan (CN); Zengfa Wu, Taiyuan (CN); Haijun Hu, Taiyuan (CN); Yuan Yuan, Taiyuan (CN); Ying Wang, Taiyuan (CN); Huiqiang Yao, Taiyuan (CN); Yuan Liu, Taiyuan (CN); Zhao Yang, Taiyuan (CN); Hongwei Guo, Taiyuan (CN)

(73) Assignee: Taiyuan University of Science and Technology, Taiyuan (CN)

( * ) Notice: Subject to any disclaimer, the term of this patent is extended or adjusted under 35 U.S.C. 154(b) by 246 days.

(21) Appl. No.: 18/413,480

(22) Filed: Jan. 16, 2024

(65) Prior Publication Data
US 2024/0308084 A1    Sep. 19, 2024

(30) Foreign Application Priority Data
Mar. 16, 2023    (CN) .......................... 202310250505.2

(51) Int. Cl.
| | |
|---|---|
| *B25J 11/00* | (2006.01) |
| *B25J 5/02* | (2006.01) |
| *B65G 39/12* | (2006.01) |

(52) U.S. Cl.
CPC ............... *B25J 11/008* (2013.01); *B25J 5/02* (2013.01); *B65G 39/12* (2013.01); *B65G 2203/0275* (2013.01); *B65G 2203/041* (2013.01)

(58) Field of Classification Search
None
See application file for complete search history.

(56) References Cited

U.S. PATENT DOCUMENTS

| | | | | |
|---|---|---|---|---|
| 3,856,133 A | * | 12/1974 | Dyachkov | ............... B65G 39/12 |
| | | | | 198/825 |
| 12,421,652 B2 | * | 9/2025 | Schechter | ............... B65B 35/24 |
| 2013/0266414 A1 | * | 10/2013 | Anderson | ............... B65G 57/04 |
| | | | | 414/793.2 |

* cited by examiner

*Primary Examiner* — Kavel Singh
(74) *Attorney, Agent, or Firm* — Reising Ethington, P.C.

(57) ABSTRACT

A conveyor belt lifting mechanism which includes an L-shaped arm, a telescopic arm, and a supporting shaft and an online operation and maintenance robot for a pipe belt conveyor are provided. One end of the L-shaped arm is rotatable, an axial direction of a rotating shaft is parallel to a conveying direction of a conveyor belt, the telescopic arm is slidably connected to the other end of the L-shaped arm, and the telescopic arm extends and retracts in an extension direction of the L-shaped arm. A universal rotary driving portion is connected to an end of the telescopic arm, the supporting shaft is fixed to an output end of the universal rotary driving portion, and two supporting rollers are arranged on the supporting shaft. An included angle between rotating shafts of the two supporting rollers is the same as that between two adjacent idlers in the pipe belt conveyor.

13 Claims, 8 Drawing Sheets

CONVEYOR BELT LIFTING MECHANISM AND ONLINE OPERATION AND MAINTENANCE ROBOT FOR PIPE BELT CONVEYOR

CROSS-REFERENCE TO RELATED APPLICATION

This patent application claims the benefit and priority of Chinese Patent Application No. 2023102505052, entitled "CONVEYOR BELT LIFTING MECHANISM AND ONLINE OPERATION AND MAINTENANCE ROBOT FOR PIPE BELT CONVEYOR" filed on Mar. 16, 2023, the disclosure of which is incorporated by reference herein in its entirety as part of the present application.

TECHNICAL FIELD

The present disclosure relates to the technical field of maintenance equipment for belt conveyors, and in particular to a conveyor belt lifting mechanism and an online operation and maintenance robot for a pipe belt conveyor.

BACKGROUND

The pipe belt conveyor is an important continuous belt conveyor with high efficiency and environmental protection in modern production, with long conveying distance and large conveying capacity. The conveyor belt forms an enclosed pipe through a hexagonal idler group arrangement, which may convey materials in a closed way, and conveying lines may be arranged in a curved manner according to topographic spatial variation. As an important part of the pipe belt conveyor, there are a large number of idlers, which are prone to wear, fracture and other problems during the operation of the conveyor, and may cause fire in serious cases. Therefore, it is particularly important to detect and maintain the state of idlers.

At present, the state detection, maintenance and replacement of idlers have not been integrated. Currently, inspection robots are basically used to detect the state of idlers, which requires to build a new walking track and is limited to the detection of idlers. If the maintenance is required, technicians still need to reach the designated failure point carrying tools or through the idler replacement device for maintenance, resulting in high time cost and low work efficiency. Moreover, the existing idler replacement device is only suitable for ordinary belt conveyors, but not for hexagonal idler structure of pipe belt conveyors. During the maintenance of the idlers, the pipe belt conveyor still needs to be halted. In order to avoid downtime for maintenance, factories often set up two parallel conveyors at the same time. When one conveyor is maintained, the other conveyor may operate directly, which is extremely expensive. Therefore, it is necessary to design an online operation and maintenance robot for an idler of a pipe belt conveyor, which can detect and automatically maintain the idler in an operating state of the pipe belt conveyor.

SUMMARY

An objective of the present disclosure is to provide a conveyor belt lifting mechanism and an online operation and maintenance robot for a pipe belt conveyor, so as to solve the problems in the prior art, the failure idler can be replaced without shutdown, and the operation and maintenance efficiency of the pipe belt conveyor is improved.

To achieve the objective above, the present disclosure provides the following solutions. A conveyor belt lifting mechanism for a pipe belt conveyor includes an L-shaped arm, a telescopic arm, and a supporting shaft. One end of the L-shaped arm is rotatable, a rotating shaft is perpendicular to a plane in which an L shape of the L-shaped arm is located, and the telescopic arm is slidably connected to an other end of the L-shaped arm. A telescopic direction of the telescopic arm is parallel to an extension direction of the L-shaped arm. A universal rotary driving portion is connected to an end of the telescopic arm, the supporting shaft is fixed to an output end of the universal rotary driving portion, and the universal rotary driving portion is able to drive the supporting shaft to rotate around the telescopic direction of the telescopic arm and a direction perpendicular to the telescopic direction. Two supporting rollers are arranged on the supporting shaft in a rolling manner, an axial direction of one supporting roller, away from the universal rotary driving portion, of the two supporting rollers is perpendicular to the telescopic direction of the telescopic arm, and an included angle between rotating shafts of the two supporting rollers is same as an included angle between rotating shafts of two adjacent idlers in the pipe belt conveyor.

In some embodiments, the conveyor belt lifting mechanism may further include a base. The base may be further provided with a supporting driving portion, a steering seat, and a steering driving portion. The steering seat may be hinged to the base. A hinged revolving shaft may be parallel to a height direction of a truss. An end of the L-shaped arm and an end of the supporting driving portion may be hinged to the steering seat, and an output end of the supporting driving portion may be hinged to the L-shaped arm for driving a hinged shaft of the L-shaped arm to rotate. An output end of the steering driving portion may be hinged to the steering seat, and a rotating shaft of the steering seat may be perpendicular to a rotating shaft of the L-shaped arm.

In some embodiments, an accommodating cavity may be formed in the L-shaped arm. A telescopic driving portion and the telescopic arm may be arranged in the accommodating cavity. The telescopic arm may be connected to a telescopic end of the telescopic driving portion.

In some embodiments, a length of the supporting roller away from the universal rotary driving portion may be not greater than half of a length of an idler on the pipe belt conveyor.

The present disclosure further provides an online operation and maintenance robot for a pipe belt conveyor. The robot includes a walking frame arranged on a truss in the pipe belt conveyor, an idler replacement mechanism arranged on the walking frame, and the conveyor belt lifting mechanism above. The idler replacement mechanism includes a seven-degree-of-freedom manipulator fixed on the walking frame, and a mechanical claw fixed at an end of the seven-degree-of-freedom manipulator. The mechanical claw includes an electric push rod, multiple grippers, a first connecting rod, multiple second connecting rods, and multiple third connecting rods. The electric push rod is fixedly arranged, a telescopic end of the electric push rod is fixedly connected to a middle portion of the first connecting rod. The multiple second connecting rods are distributed at two ends of the first connecting rod and are hinged to the ends of the first connecting rod. Other ends of the second connecting rods are respectively hinged to the third connecting rods, one end of each of the third connecting rods is provided in a hinged manner, and an other end of each of the third connecting rods is fixedly provided with one of the plurality of grippers.

In some embodiments, the idler replacement mechanism may further include two cylinders located on both sides of the multiple grippers, and extending ends of the two cylinders may be abutted against idler shafts at two ends of an idler gripped by the plurality of grippers.

In some embodiments, four conveyor belt lifting mechanisms may be provided and distributed on the walking frame along a rectangular trajectory, a central plane of the rectangular trajectory may coincide with a central plane of the walking frame, and the four conveyor belt lifting mechanisms may be respectively located on four vertices of the rectangular trajectory. In some embodiments, the walking frame may be also provided with a placing frame for placing new idlers and failure idlers.

In some embodiments, the robot may further include a detection mechanism for detecting a state of the idler on the truss. The detection mechanism may include a guide rail, a sliding driving mechanism, a synchronous belt, and a camera detection portion. The guide rail may be fixed vertically downwards on the walking frame. The sliding drive mechanism may be fixed at a top end of the guide rail, and a synchronous wheel may be fixed to an output end of the sliding driving mechanism. The synchronous wheel may be in transmission connection with the synchronous belt. The camera detection portion may be fixed to the synchronous belt for observing an operating state of the idler on the truss in real time. In some embodiments, a detection instrument fixing box may be also fixed to the synchronous belt, and a temperature and humidity sensor for measuring temperature and humidity of an external environment, a sound sensor and a first storage battery may be arranged inside the detection instrument fixing box. The camera detection portion may include a camera and infrared thermal imager fixed at a bottom of the detection instrument fixing box.

In some embodiments, walking motors, walking wheels, guide brackets and guide wheels may be arranged on the walking frame. The walking wheels may be arranged at a bottom of the walking frame, may be located on an upper surface of the truss, and may be respectively in transmission connection with the walking motors. The guide brackets may be fixed to the bottom of a walking bracket. A guide rod may be arranged on each of the guide brackets in a width direction of the truss. The guide wheels may be arranged on a side surface of the truss. A rotating shaft of each of the guide wheels may be slidably arranged on the guide rod. A compression spring may be further arranged between the rotating shaft of the guide wheel and an end of the guide rod. The compression spring may be configured to press the guide wheel against the side surface of the truss. The walking frame may include an upper supporting plate and a lower supporting plate below the upper supporting plate, and the base, the seven-degree-of-freedom manipulator and the placing frame may be fixed to the upper supporting plate. The walking motors and a second storage battery both may be fixed to the lower supporting plate.

In some embodiments, a window plate may be arranged at an installation position of the idler on the truss, an identification code may be arranged on the window plate, and a card reader for identifying the identification code may be also arranged in the detection instrument fixing box.

Compared with the prior art, the embodiments obtain the following beneficial technical effects:

1. The conveyor belt lifting mechanism provided can automatically lift the pipe belt conveyor to separate the pipe belt conveyor from the failure idler, such that the failure idler can be replaced without shutdown, and the operation and maintenance efficiency of the pipe belt conveyor is improved.
2. By providing the supporting oil cylinder and the universal rotary driving portion, it is ensured that the supporting shaft is free of interfering with a cross beam, a stringer and an oblique beam on the truss in the process of rotating to an XZ plane, and the supporting shaft can enter the bottom of the pipe conveyor belt smoothly.
3. The robot integrates the state detection, maintenance and replacement of the idler, and can simultaneously detect the state of the idler in a bearing section and a return section of the pipe belt conveyor on the premise of not adding a track, thus avoiding the huge economic loss caused by the shutdown of the conveyor. Moreover, the robot is high intelligent degree, and greatly improves the operation and maintenance efficiency of the pipe belt conveyor.

BRIEF DESCRIPTION OF THE DRAWINGS

To describe the technical solutions of the embodiments of the present disclosure or in the prior art more clearly, the following briefly introduces the accompanying drawings required for describing the embodiments. Apparently, the accompanying drawings in the following description show merely some embodiments of the present disclosure, and those of ordinary skill in the art may still derive other drawings from these accompanying drawings without creative efforts.

Figure 1:
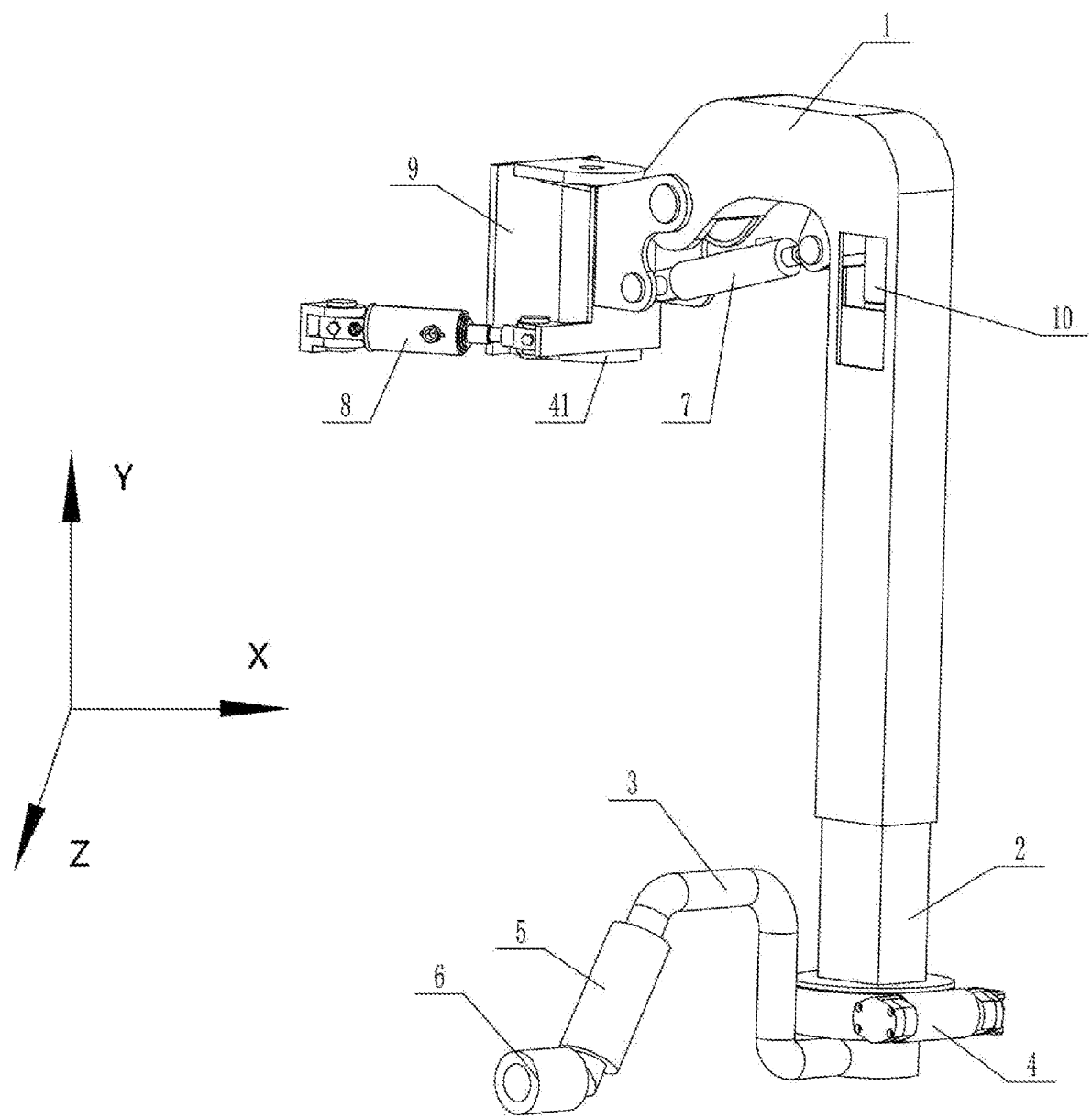
FIG. 1 is a structural schematic diagram of a conveyor belt lifting mechanism according to the present disclosure.
Figure 2:
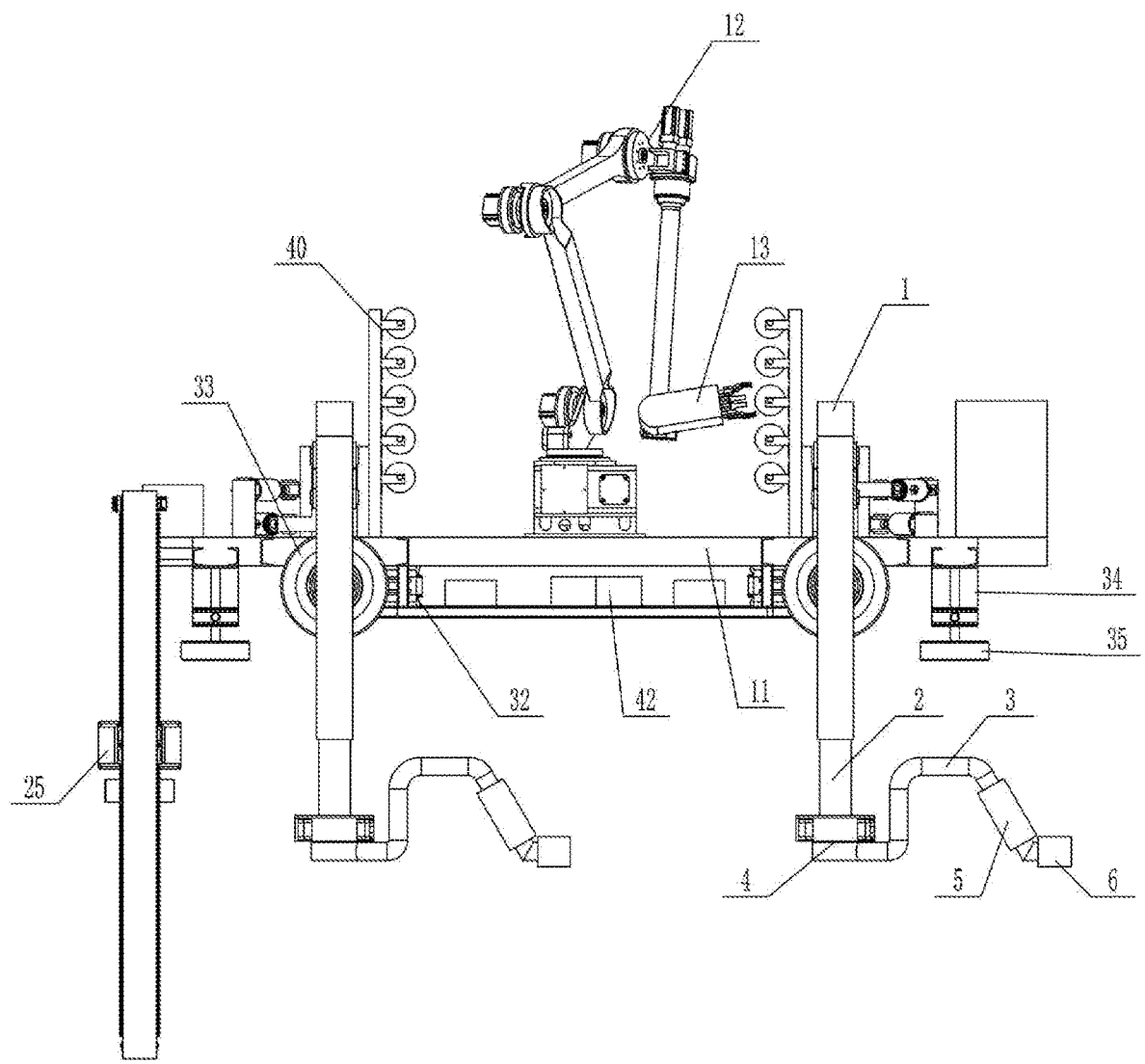
FIG. 2 is a structural schematic diagram of an operation and maintenance robot according to the present disclosure.
Figure 3:
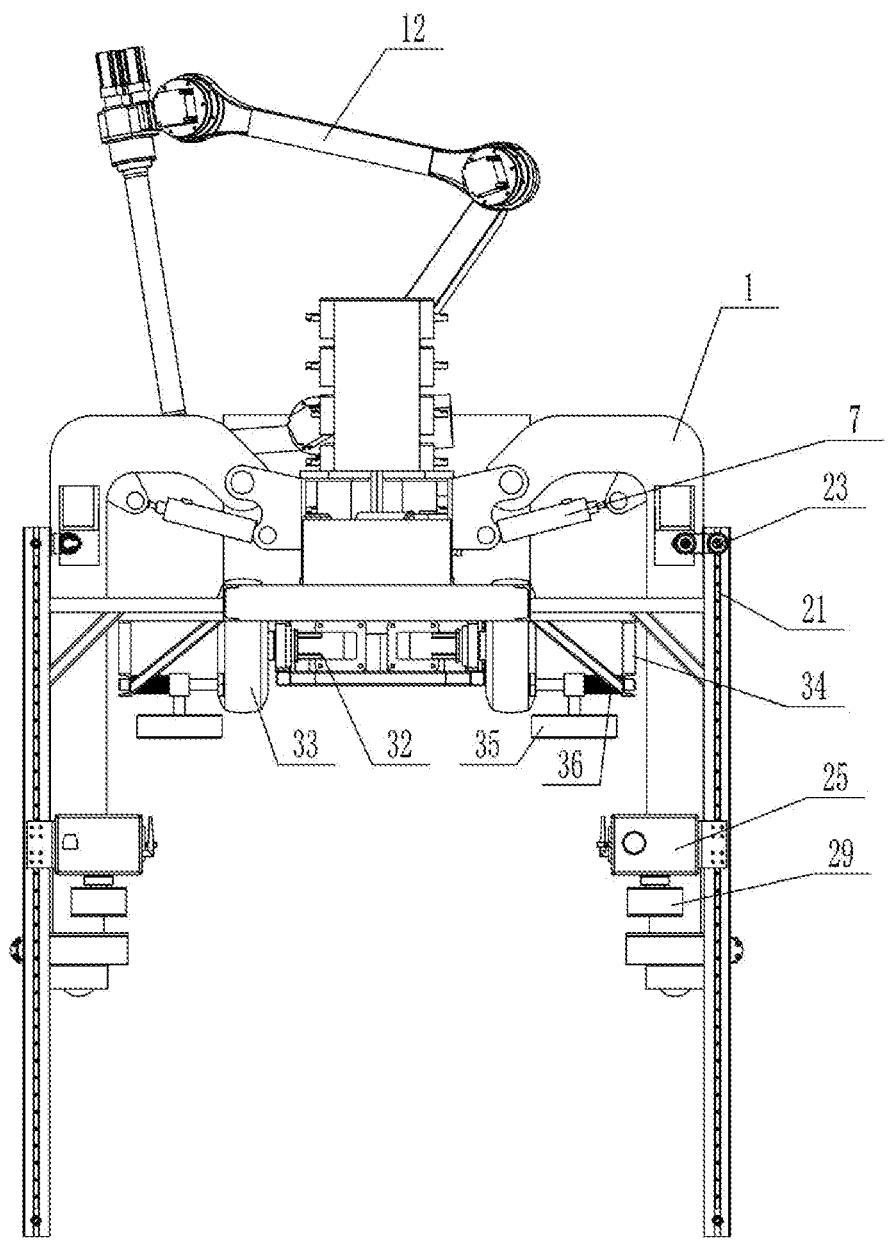
FIG. 3 is a side view of FIG. 2.
Figure 4:
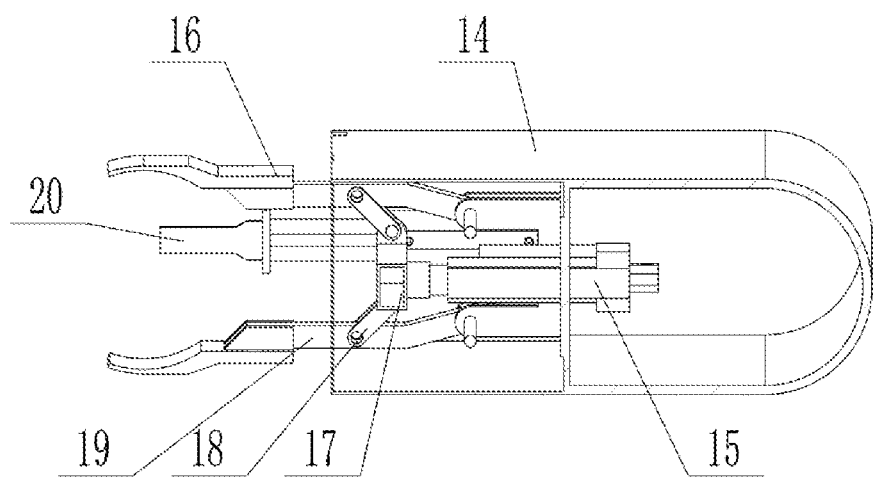
FIG. 4 is a schematic diagram of an internal structure of a mechanical claw.
Figure 5:
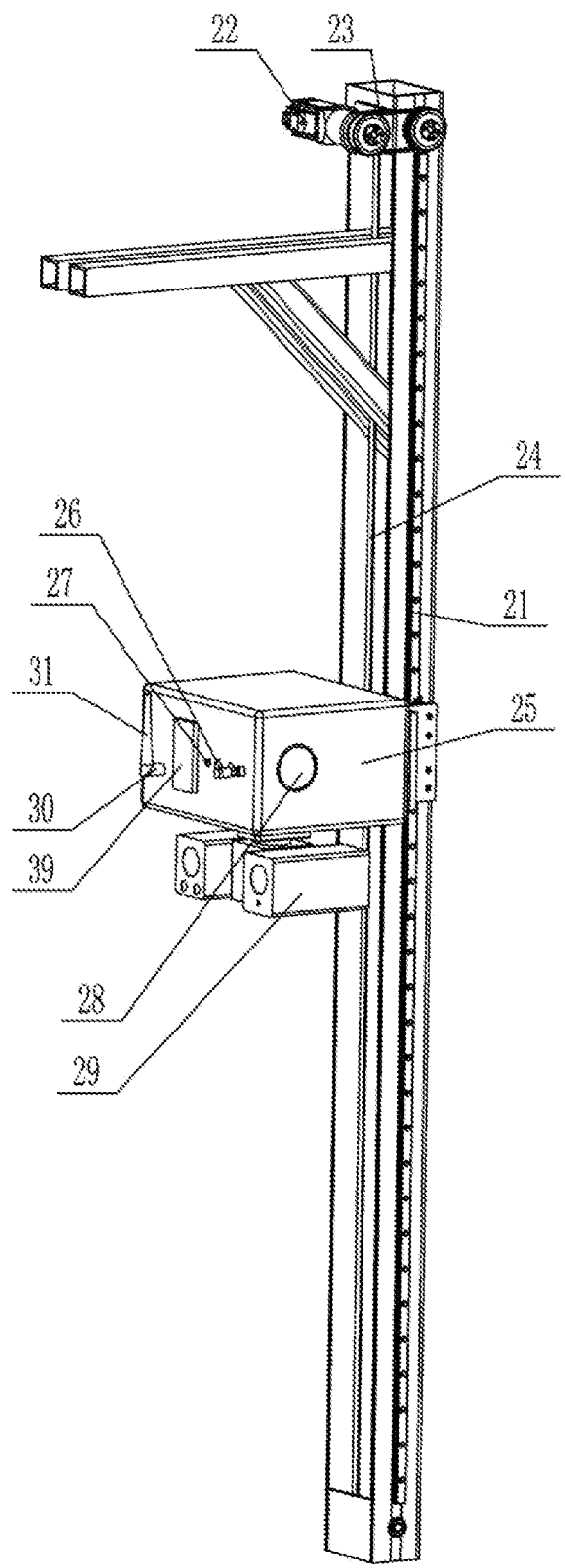
FIG. 5 is a structural schematic diagram of a detection structure.
Figure 6:
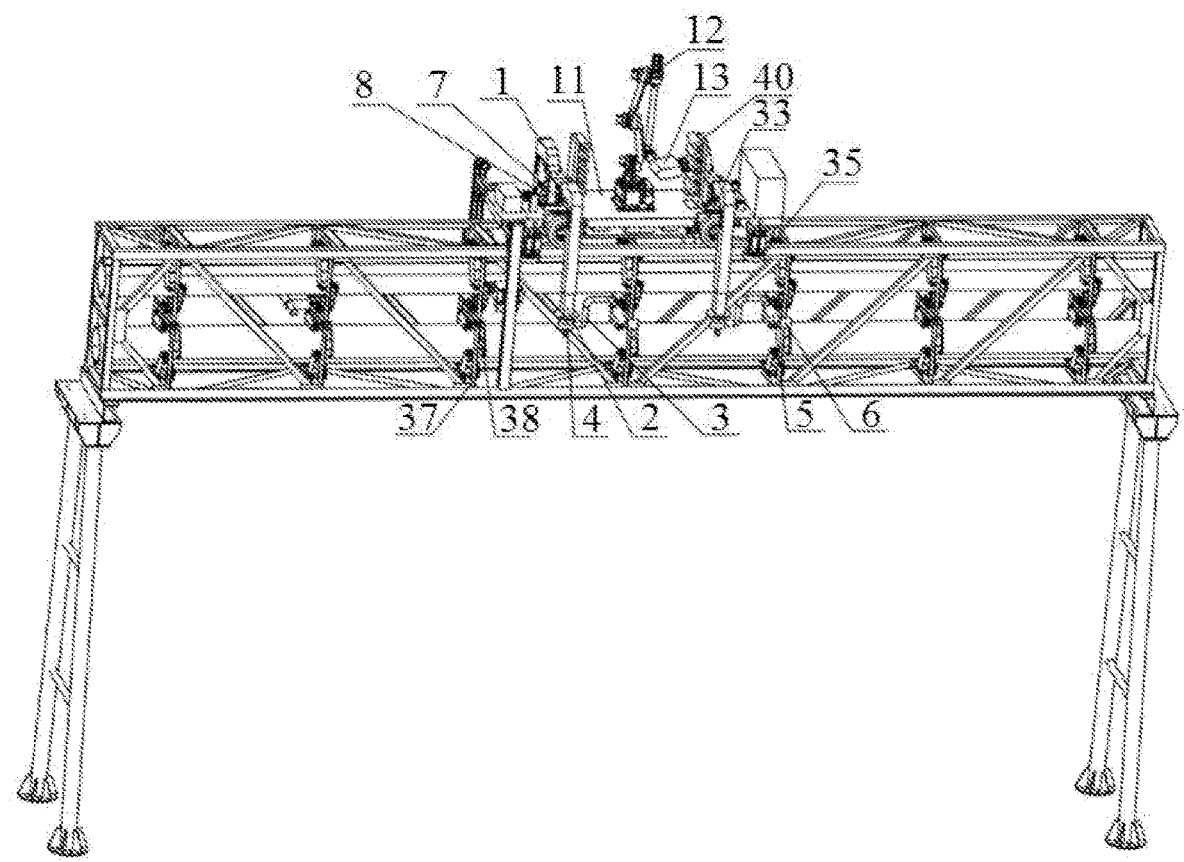
FIG. 6 is a structural schematic diagram illustrating the cooperation of an operation and maintenance robot and a pipe belt conveyor.
Figure 7:
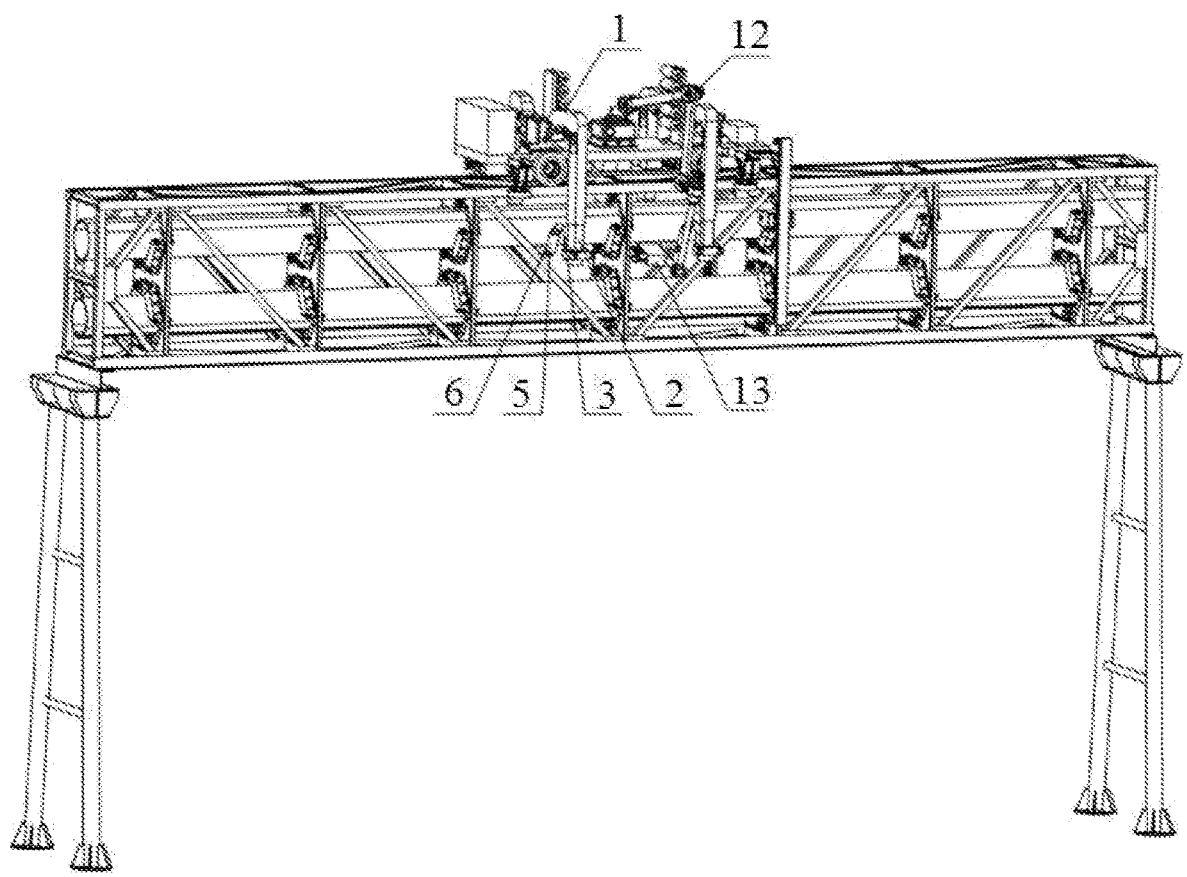
FIG. 7 is a schematic diagram of an operation and maintenance robot when maintaining an idler in a bearing section according to the present disclosure.
Figure 8:
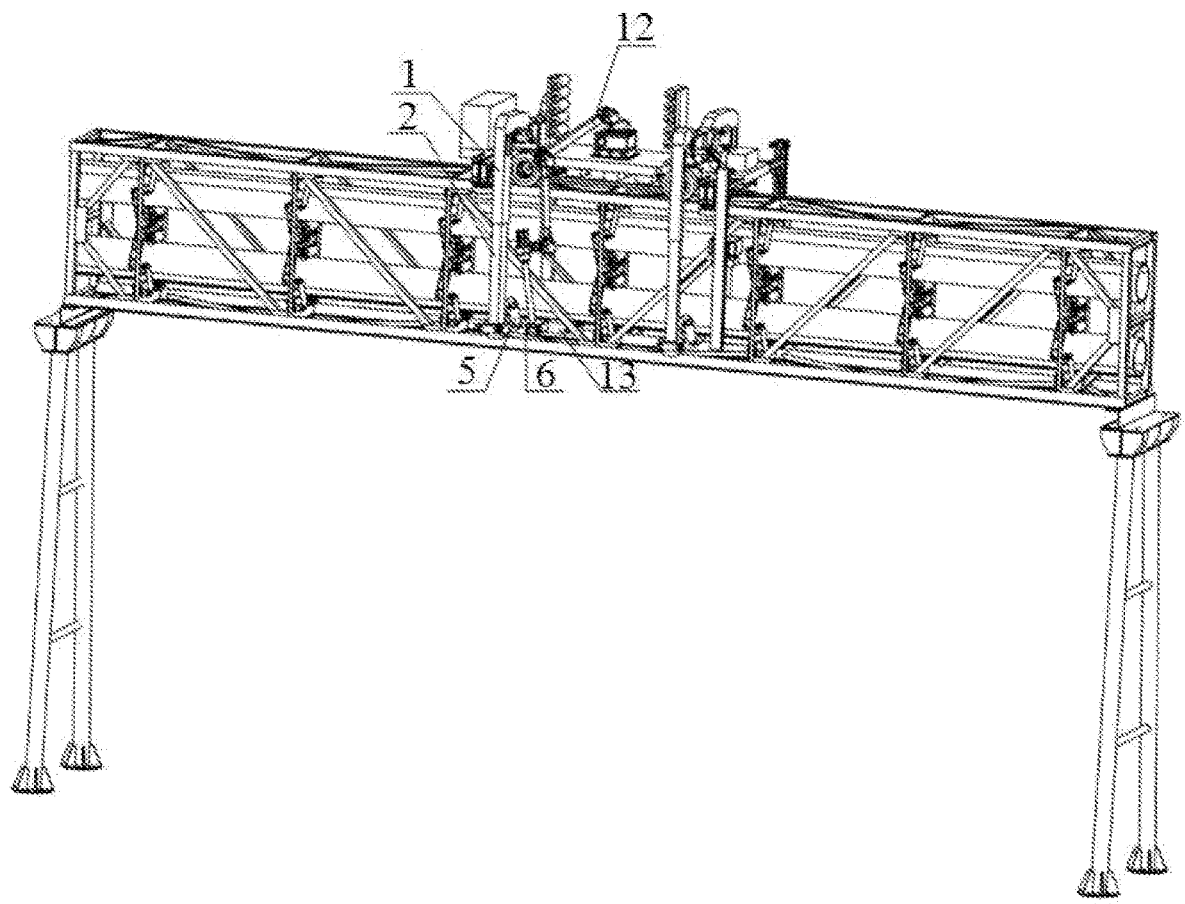
FIG. 8 is a schematic diagram of an operation and maintenance robot when maintaining an idler in a return section according to the present disclosure.

List of the reference characters: 1 L-shaped arm; 2 telescopic arm; 3 supporting shaft; 4 universal rotary driving portion; 5 supporting roller; 6 supporting half roller; 7 supporting oil cylinder; 8 steering oil cylinder; 9 base; 10 telescopic oil cylinder; 11 walking frame; 12 seven-degree-of-freedom manipulator; 13 mechanical claw; 14 housing; 15 electric push rod; 16 gripper; 17 first connecting rod; 18 second connecting rod; 19 third connecting rod; 20 cylinder; 21 guide rail; 22 sliding driving mechanism; 23 synchronous wheel; 24 synchronous belt; 25 detection instrument fixing box; 26 temperature and humidity sensor; 27 sound sensor; 28 first storage battery; 29 camera and infrared thermal imager; 30 wireless module; 31 antenna; 32 walking motor; 33 walking wheel; 34 guide bracket; 35 guide wheel; 36 compression spring; 37 window plate; 38 identification code; 39 card reader; 40 placing frame; 42 steering seat; and 42 second storage battery.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a conveyor belt lifting mechanism and an online operation and maintenance robot for a pipe belt conveyor, so as to solve the problems in the prior art, the failure idler can be replaced without shutdown, and the operation and maintenance efficiency of the pipe belt conveyor is improved.

To make the objectives, features and advantages of the present disclosure more apparently and understandably, the following further describes the present disclosure in detail with reference to the accompanying drawings and the specific embodiments.

Embodiment I

As shown in FIG. 1, a conveyor belt lifting mechanism for a pipe belt conveyor provided by this embodiment includes an L-shaped arm 1, a telescopic arm 2, and a supporting shaft 3. One end of the L-shaped arm 1 is rotatable, an axial direction of a rotating shaft is parallel to a conveying direction of a conveyor belt, and the telescopic arm 2 is slidably connected to the other end of the L-shaped arm. The telescopic arm 2 extends and retracts in an extension direction of the L-shaped arm 1. A universal rotary driving portion 4 is connected to an end of the telescopic arm 2, the supporting shaft 3 is fixed to an output end of the universal rotary driving portion 4, and the universal rotary driving portion 4 can drive the supporting shaft 3 to rotate around a telescopic direction of the telescopic arm 2 and a direction perpendicular to the telescopic direction. Two supporting rollers 5 are arranged on the supporting shaft 3 in a rolling manner, an included angle between rotating shafts of the two supporting rollers 5 is the same as an included angle between two adjacent idlers in the pipe belt conveyor, and the length of the supporting roller 5 away from the universal rotary driving portion 4 is not greater than half the length of the idler on the pipe belt conveyor, so as to form a supporting half roller 6, and an axial direction of the supporting half roller 6 is perpendicular to the telescopic direction of the telescopic arm 2. In this embodiment, the length of the supporting half roller 6 is slightly less than half the length of the idler, and the length of another supporting roller 5 is the same as that of the idler. During use, two conveyor belt lifting mechanisms are symmetrically arranged for use.

Further, the conveyor belt lifting mechanism further includes a base 9, the base 9 is further provided with a supporting driving portion, a steering seat 41, and a steering driving portion. The steering seat 41 is hinged to the base 9, a hinged revolving shaft is parallel to a height direction of a truss, an end of the L-shaped arm and an end of the supporting driving portion are hinged to the steering seat 41, and an output end of the supporting driving portion is hinged to the L-shaped arm 1 for driving a hinged shaft of the L-shaped arm 1 to rotate. An output end of the steering driving portion is hinged to the steering seat 41, and a rotating shaft of the steering seat 41 is perpendicular to a rotating shaft of the L-shaped arm 1. Specifically, the supporting driving portion is a supporting oil cylinder 7, and the steering driving portion is a steering oil cylinder 8.

Further, an accommodating cavity is formed in the L-shaped arm 1 in this embodiment, a telescopic driving portion and the telescopic arm 2 are arranged in the accommodating cavity, and the telescopic arm 2 is connected to a telescopic end of the telescopic driving portion 2. Specifically, the telescopic driving portion is a telescopic oil cylinder 10.

To better show the operating process, in this embodiment, a conveying direction of the pipe belt conveyor is a Y direction (a length direction of the truss in the pipe belt conveyor), an upward direction perpendicular to the Y direction is a Z direction (a height direction of the truss), and a direction perpendicular to a YZ plane is an X direction (a width direction of the truss). During use, the conveyor belt lifting mechanisms are arranged at the top of the truss of the pipe belt conveyor in pairs, and one edge of the L-shaped arm 1 is located at one side of the truss. The L-shaped arm 1 rotates around an Z axis under the action of the steering oil cylinder 8, making the L-shaped arm 1 located in an XZ plane. Afterwards, the supporting oil cylinder 7 extends, and the L-shaped arm 1 rotates around a Y axis under the action of the supporting oil cylinder 7, such that the L-shaped arm is in an unfolded state and far away from the truss. The telescopic arm 2 may extend a certain length according to actual conditions, so as to adapt to the idler maintenance at a bearing section and a return section. The universal rotary driving portion 4 may drive the supporting shaft 3 to rotate at any angle. In this embodiment, the supporting shaft 3 requires to rotate around the Z axis or perpendicular to the Z axis. When the idler at the bottom of the pipe belt conveyor needs to be replaced, the universal rotary driving portion 4 drives the supporting shaft 3 to rotate, thus making the supporting shaft 3 located in the XZ plane. Then, the supporting oil cylinder 7 retracts, making the L-shaped arm 1 gradually approach the truss. When the telescopic arm 2 is parallel to the Z direction, the supporting oil cylinder 7 stops moving. At this time, the two supporting rollers 5 are located at the bottom of the pipe conveyor belt. Finally, the telescopic oil cylinder 10 moves to drive the telescopic arm 2 to retract and pull up the supporting shaft 3. The supporting roller 5 and the supporting half roller 6 can lift the pipe conveyor belt by a proper distance, making a failure idler separated from the pipe conveyor belt; and the pipe conveyor belt continues to be conveyed on the supporting roller 5 and the backup half roller 6, and the failure idler can be replaced. As the length of the backup half roller 6 is slightly less than half the length of the idler, when the two conveyor belt lifting mechanisms are used in pairs, the two backup half rollers 6 are just opposite to each other to effectively support the pipe conveyor belt at the same position.

Therefore, the conveyor belt lifting mechanism in this embodiment can automatically lift the pipe belt conveyor to separate the pipe belt conveyor from the failure idler, such that the failure idler can be replaced without shutdown, and the operation and maintenance efficiency of the pipe belt conveyor is improved.

Moreover, by providing the supporting oil cylinder 7 and the universal rotary driving portion 4, it is ensured that in the process of rotating to the XZ plane and in the process that the supporting oil cylinder 7 retracts to make the supporting shaft 3 move to toe bottom of the pipe conveyor belt, the supporting shaft 3 is free of interfering with a cross beam, a stringer and an oblique beam on the truss in the process of rotating to an XZ plane, and the supporting shaft can enter the bottom of the pipe conveyor belt smoothly. The steering oil cylinder 8 is configured for adjusting a posture of the L-shaped arm 1. The specific structure of the rotary drive unit 4, which is a common device in this field, will not be described in detail in this embodiment.

Embodiment II

As shown in FIG. 2 to FIG. 8, the this embodiments further provides an online operation and maintenance robot for a pipe belt conveyor. The robot includes a walking frame 11 arranged on a truss, an idler replacement mechanism arranged on the walking frame 11, and a conveyor belt lifting mechanism above. The idler replacement mechanism includes a seven-degree-of-freedom manipulator 12 fixed on the walking frame 11, and a mechanical claw 13 fixed to an end of the seven-degree-of-freedom manipulator 12. The mechanical claw 13 includes a housing 14, an electric push rod 15 arranged in the housing 14, grippers 16, a first connecting rod 17, multiple second connecting rods 18, and multiple third connecting rods 19. The electric push rod 15 is fixedly arranged, a telescopic end of which is fixedly connected to a middle portion of the first connecting rod. The multiple second connecting rods 18 are distributed at two ends of the first connecting rod 17 and are hinged to the ends of the first connecting rod 17; and the other ends of the second connecting rods 18 are hinged to the third connecting rods 19. One end of each third connecting rod 19 is provided in a hinged manner, and the other end of the third connecting rod is provided with the gripper 16 in a fixed manner. The idler replacement mechanism further includes cylinders 20 located at both sides of the multiple grippers 16, and extending ends of the two cylinders 20 are abutted against idler shafts at two ends of an idler gripped by the gripper 16. By pushing and pulling, the electric push rod 15 can enable the gripper 16 to grab the failure idler or the new idler, and the cylinder 20 can prop against the idler shaft to prevent the idler from rolling or slipping.

Further, four conveyor belt lifting mechanisms are provided and distributed on the walking frame 11 along a rectangular trajectory, a central plane of the rectangular trajectory coincides with a central plane of the walking frame 11, and the four conveyor belt lifting mechanisms are respectively located on four vertices of the rectangular trajectory, so as to lift the pipe conveyor belts at front and rear sides of the fault idler at the same time. The walking frame 11 is also provided with a placing frame 40 for placing new idlers and failure idlers.

Further, the robot further includes a detection mechanism for detecting a state of the idler on the truss. The detection mechanism includes a guide rail 21, a sliding driving mechanism 22, a synchronous belt 24, and a camera detection portion. The guide rail 21 is fixed vertically downwards on the walking frame 11, the sliding drive mechanism 22 is fixed at a top end of the guide rail 21, and a synchronous wheel 23 is fixed to an output end of the sliding driving mechanism. The synchronous wheel 23 is in transmission connection with the synchronous belt 24. The camera detection portion is fixed to the synchronous belt 24 for observing an operating state of the idler on the truss in real time. A detection instrument fixing box 25 is also fixed to the synchronous belt 24, and a temperature and humidity sensor 26 for measuring temperature and humidity of the external environment, a sound sensor 27 and a first storage battery 28 are arranged inside the detection instrument fixing box 25. The camera detection portion includes a camera and infrared thermal imager 29 fixed at the bottom of the detection instrument fixing box 25. The detection instrument fixing box 25 is further provided with a wireless module 30 and an antenna 31, which can transmit collected information to an upper computer by means of wireless signals.

Further, in this embodiment, walking motors 32, walking wheels 33, guide brackets 34 and guide wheels 35 are arranged on the walking frame 11. The walking wheels 33 are arranged at the bottom of the walking frame 11, are located on an upper surface of the truss, and are respectively in transmission connection with the walking motors 32. The guide brackets 34 are fixed to the bottom of a walking bracket, a guide rod is arranged on the guide bracket 34 in a width direction of the truss, the guide wheels 35 are arranged on a side surface of the truss, a rotating shaft of the guide wheel 35 is slidably arranged on the guide rod, and a compression spring 36 is further arranged between the rotating shaft of the guide wheel 35 and an end of the guide rod. The compression spring 36 is configured to press the guide wheel 35 against the side surface of the truss to guide a movement direction of the robot, thus preventing the robot from deviating. The preload of the guide wheel 35 increases the adhesion between a chassis and the truss, improves the climbing adhesion, and reduces the risk of the robot overturning. The walking frame 11 includes an upper supporting plate, and a lower supporting plate below the upper supporting plate. The base 9, the seven-degree-of-freedom manipulator 12 and the placing frame 40 are fixed to the upper supporting plate, and the walking motors 32 and a second storage battery 42 are fixed to the lower supporting plate.

Further, in this embodiment, a window plate 37 is arranged at an installation position of a corresponding idler on the truss, an identification code 38 is arranged on the window plate 37, and a card reader 39 for identifying the identification code 38 is also arranged in the detection instrument fixing box 25. When the camera and infrared thermal imager detects the failure idler, the card reader 39 reads the identification code on the corresponding window plate 37, a controller, according to the information of the identification code 38, controls the walking motor 32 to move the walking frame 11 to a position where the failure idler is located, and the failure idler is replaced using the conveyor belt lifting mechanism and the idler replacement mechanism.

During operation, the walking frame 11 runs on the truss. During the running process, the detection instrument fixing box 25 and the camera and infrared thermal imager 29 move up and down along the guide rail 21 to collect running state information of the idler on the truss, and the collected data information is transmitted to the upper computer through the wireless module 30 and the antenna 31. The upper computer processes and analyzes the collected data using the image processing technology and acoustic diagnosis technology to determine the state of the idler. After finding the failure idler, the upper computer issues a command, and according to the obtained position information of the failure idler, the walking frame 11 runs to the position where the failure idler is located, the conveying belt lifting mechanism starts to operate. At first, the steering oil cylinder 8 moves, enabling the steering seat 41 to rotate around a Z axis at a certain angle to a position where the L-shaped arm 1 and the telescopic arm 2 are free of interfering with the truss diagonal during the movement. The processes in Embodiment 1 are repeated to lift the pipe conveyor belt by the supporting rollers 5 and the backup half rollers 6. The seven-degree-of-freedom manipulator 12 drives the mechanical claw 13 to move to the position of the failure idler to dismount the failure idler and place the failure idler on the placing frame 40; and then to clamp a new idler and mount the new idler at the dismounting position, thus completing the replacement of the idler. Afterwards, the L-shaped arm 1, the telescopic arm 2 and the supporting shaft 3 can return to the initial positions to continue the idler operation and maintenance task of the pipe belt conveyor.

It should be noted that the existing idler frame in the pipe belt conveyor adopts a fixed structure of fixing the idler by bolts, and the bolts for fixing the idler need to be dismounted when disassembling the idlers, leading to the unrealizability of intelligent idler operation and maintenance and automatic idler replacement; and a new idler fixing method needs to be redesigned. In this embodiment, the detachable idler structure designed by Taizhong Xiangming Intelligent Equipment Co., Ltd. is adopted as the new idler fixing method to achieve the function of automatically replacing the idler of the pipe belt conveyor without shutdown, from the patent with title "quick-roll-replacing idler set for a pipe belt conveyor", and patent number CN113788292A.

However, it is apparently within the scope of protection of the present disclosure to adopt other mechanical claws 13, such as mechanical claws 13 with bolt removal function, to complete the idler replacement.

Adaptive changes made according to actual needs are within the scope of protection of the present disclosure.

It should be noted that it is apparent to those skilled in the art that the present disclosure is not limited to the details of the above exemplary embodiments, and can be realized in other specific forms without departing from the spirit or basic characteristics of the present disclosure. Therefore, the embodiments should be considered as exemplary and non-limiting in all aspects, and the scope of the present disclosure is defined by the appended claims rather than the above description, so it is intended to embrace all changes that fall within the meaning and range of equivalents of the claims. Any reference signs in the claims should not be regarded as limiting the claims involved.

The invention claimed is:

1. A conveyor belt lifting mechanism for a pipe belt conveyor, comprising an L-shaped arm, a telescopic arm, and a supporting shaft, wherein one end of the L-shaped arm is rotatable, a rotating shaft is perpendicular to a plane in which an L shape of the L-shaped arm is located, and the telescopic arm is slidably connected to an other end of the L-shaped arm; a telescopic direction of the telescopic arm is parallel to an extension direction of the L-shaped arm; a universal rotary driving portion is connected to an end of the telescopic arm, the supporting shaft is fixed to an output end of the universal rotary driving portion, and the universal rotary driving portion is able to drive the supporting shaft to rotate around the telescopic direction of the telescopic arm and a direction perpendicular to the telescopic direction; two supporting rollers are arranged on the supporting shaft in a rolling manner, an axial direction of one supporting roller, away from the universal rotary driving portion, of the two supporting rollers is perpendicular to the telescopic direction of the telescopic arm, and an included angle between rotating shafts of the two supporting rollers is same as an included angle between rotating shafts of two adjacent idlers in the pipe belt conveyor.

2. The conveyor belt lifting mechanism for a pipe belt conveyor according to claim 1, wherein the conveyor belt lifting mechanism further comprises a base, the base is further provided with a supporting driving portion, a steering seat, and a steering driving portion; the steering seat is hinged to the base, a hinged revolving shaft is parallel to a height direction of a truss, an end of the L-shaped arm and an end of the supporting driving portion are hinged to the steering seat, and an output end of the supporting driving portion is hinged to the L-shaped arm for driving a hinged shaft of the L-shaped arm to rotate; an output end of the steering driving portion is hinged to the steering seat, and a rotating shaft of the steering seat is perpendicular to a rotating shaft of the L-shaped arm.

3. The conveyor belt lifting mechanism for a pipe belt conveyor according to claim 2, wherein an accommodating cavity is formed in the L-shaped arm, a telescopic driving portion and the telescopic arm are arranged in the accommodating cavity, and the telescopic arm is connected to a telescopic end of the telescopic driving portion.

4. The conveyor belt lifting mechanism for a pipe belt conveyor according to claim 1, wherein a length of the supporting roller away from the universal rotary driving portion is not greater than half of a length of an idler on the pipe belt conveyor.

5. An online operation and maintenance robot for a pipe belt conveyor, comprising a walking frame arranged on a truss in the pipe belt conveyor, an idler replacement mechanism arranged on the walking frame, and the conveyor belt lifting mechanism according to claim 2, wherein the idler replacement mechanism comprises a seven-degree-of-freedom manipulator fixed on the walking frame, and a mechanical claw fixed at an end of the seven-degree-of-freedom manipulator; the mechanical claw comprises an electric push rod, a plurality of grippers, a first connecting rod, a plurality of second connecting rods, and a plurality of third connecting rods; the electric push rod is fixedly arranged, a telescopic end of the electric push rod is fixedly connected to a middle portion of the first connecting rod; the plurality of second connecting rods are distributed at two ends of the first connecting rod and are hinged to the ends of the first connecting rod; and other ends of the second connecting rods are respectively hinged to the third connecting rods, one end of each of the third connecting rods is provided in a hinged manner, and an other end of each of the third connecting rods is fixedly provided with one of the plurality of grippers.

6. The online operation and maintenance robot for a pipe belt conveyor according to claim 5, wherein the idler replacement mechanism further comprises two cylinders located on both sides of the plurality of grippers, and extending ends of the two cylinders are abutted against idler shafts at two ends of an idler gripped by the plurality of grippers.

7. The online operation and maintenance robot for a pipe belt conveyor according to claim 5, wherein four conveyor belt lifting mechanisms are provided and distributed on the walking frame along a rectangular trajectory, a central plane of the rectangular trajectory coincides with a central plane of the walking frame, and the four conveyor belt lifting mechanisms are respectively located on four vertices of the rectangular trajectory; and preferably, the walking frame is also provided with a placing frame for placing new idlers and failure idlers.

8. The online operation and maintenance robot for a pipe belt conveyor according to claim 7, further comprising a detection mechanism for detecting a state of the idler on the truss, wherein the detection mechanism comprises a guide rail, a sliding driving mechanism, a synchronous belt, and a camera detection portion; the guide rail is fixed vertically downwards on the walking frame, the sliding drive mechanism is fixed at a top end of the guide rail, and a synchronous wheel is fixed to an output end of the sliding driving mechanism; the synchronous wheel is in transmission connection with the synchronous belt; the camera detection portion is fixed to the synchronous belt for observing an operating state of the idler on the truss in real time; preferably, a detection instrument fixing box is also fixed to the synchronous belt, and a temperature and humidity sensor for measuring temperature and humidity of an external environment, a sound sensor and a first storage battery are arranged inside the detection instrument fixing box; and the camera detection portion comprises a camera and infrared thermal imager fixed at a bottom of the detection instrument fixing box.

9. The online operation and maintenance robot for a pipe belt conveyor according to claim 8, wherein walking motors, walking wheels, guide brackets and guide wheels are arranged on the walking frame; the walking wheels are arranged at a bottom of the walking frame, are located on an upper surface of the truss, and are respectively in transmission connection with the walking motors; the guide brackets are fixed to the bottom of a walking bracket, a guide rod is arranged on each of the guide brackets in a width direction of the truss, the guide wheels are arranged on a side surface of the truss, a rotating shaft of each of the guide wheels is slidably arranged on the guide rod, and a compression spring is further arranged between the rotating shaft of the guide wheel and an end of the guide rod; the compression spring is configured to press the guide wheel against the side surface of the truss; the walking frame comprises an upper supporting plate and a lower supporting plate below the upper supporting plate, and the base, the seven-degree-of-freedom manipulator and the placing frame are fixed to the upper supporting plate; and the walking motors and a second storage battery both are fixed to the lower supporting plate.

10. The online operation and maintenance robot for a pipe belt conveyor according to claim 9, wherein a window plate is arranged at an installation position of the idler on the truss, an identification code is arranged on the window plate, and a card reader for identifying the identification code is also arranged in the detection instrument fixing box.

11. The online operation and maintenance robot for a pipe belt conveyor according to claim 5, wherein an accommodating cavity is formed in the L-shaped arm, a telescopic driving portion and the telescopic arm are arranged in the accommodating cavity, and the telescopic arm is connected to a telescopic end of the telescopic driving portion.

12. The online operation and maintenance robot for a pipe belt conveyor according to claim 11, wherein four conveyor belt lifting mechanisms are provided and distributed on the walking frame along a rectangular trajectory, a central plane of the rectangular trajectory coincides with a central plane of the walking frame, and the four conveyor belt lifting mechanisms are respectively located on four vertices of the rectangular trajectory; and preferably, the walking frame is also provided with a placing frame for placing new idlers and failure idlers.

13. The online operation and maintenance robot for a pipe belt conveyor according to claim 12, further comprising a detection mechanism for detecting a state of the idler on the truss, wherein the detection mechanism comprises a guide rail, a sliding driving mechanism, a synchronous belt, and a camera detection portion; the guide rail is fixed vertically downwards on the walking frame, the sliding drive mechanism is fixed at a top end of the guide rail, and a synchronous wheel is fixed to an output end of the sliding driving mechanism; the synchronous wheel is in transmission connection with the synchronous belt; the camera detection portion is fixed to the synchronous belt for observing an operating state of the idler on the truss in real time; preferably, a detection instrument fixing box is also fixed to the synchronous belt, and a temperature and humidity sensor for measuring temperature and humidity of an external environment, a sound sensor and a first storage battery are arranged inside the detection instrument fixing box; and the camera detection portion comprises a camera and infrared thermal imager fixed at a bottom of the detection instrument fixing box.

* * * * *